United States Patent [19]
Moon et al.

[11] Patent Number: 6,064,975
[45] Date of Patent: *May 16, 2000

[54] APPARATUS AND METHOD FOR HIGHLIGHTING HOLIDAYS OF A SPECIFIED LOCATION IN A CALENDAR SOFTWARE APPLICATION

[75] Inventors: Billy G. Moon, Apex; Tammy A. Wooldridge, Raleigh, both of N.C.

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/955,911

[22] Filed: Oct. 22, 1997

[51] Int. Cl.⁷ ...................................................... G06F 17/60
[52] U.S. Cl. ................................. 705/8; 705/9; 345/334; 345/431
[58] Field of Search ...................... 705/9, 8, 1; 345/334, 345/431; 364/705.08

[56] References Cited

U.S. PATENT DOCUMENTS

| | | | |
|---|---|---|---|
| 4,512,667 | 4/1985 | Doulton et al. | 368/10 |
| 5,644,722 | 7/1997 | Miyamoto et al. | 705/9 |
| 5,761,646 | 6/1998 | Frid-Nielsen et al. | 705/9 |
| 5,778,346 | 7/1998 | Frid-Nielsen et al. | 705/9 |
| 5,799,423 | 9/1998 | Malino | 40/107 |
| 5,819,227 | 10/1998 | Obuchi | 705/1 |
| 5,842,177 | 11/1998 | Haynes et al. | 705/8 |
| 5,845,257 | 12/1998 | Fu et al. | 705/8 |
| 5,855,006 | 12/1998 | Huemoeller et al. | 705/9 |
| 5,873,108 | 2/1999 | Goyal et al. | 707/507 |

FOREIGN PATENT DOCUMENTS

| | | |
|---|---|---|
| 0 358 301 A2 | 3/1990 | European Pat. Off. . |
| 0 641 129 A1 | 3/1995 | European Pat. Off. . |
| 59-045573 | 3/1984 | Japan . |
| 05108010 | 4/1993 | Japan . |
| 06291868 | 10/1994 | Japan . |
| 08329016 | 12/1996 | Japan . |
| 2 038 513 | 7/1980 | United Kingdom . |
| WO 94/11980 | 5/1994 | WIPO . |

OTHER PUBLICATIONS

Stumpf, M. "Vielofax—Sieben Computer fur die Handflache" c't magazin fur Computertechnik, Jan. 1997, pp. 168–170, pp. 172–174, p. 176, pp. 178–180, p. 182, p. 184.

"Listing of Calendar Items through Device Driver Mechanisms," IBM Technical Disclosure Bulletin, vol. 36, No. 06A, Jun. 1993, pp. 121–.122.

Software Labs web site; http://www.softwarelabs.com/win31/win3177.htm (color print screen images), Nov. 1995.

Anno Domini Shareware web site; http://ourworld.compuserv.com/homepages/enzo$_{13}$ciaffarafa/overview.htm, 1999.

*Primary Examiner*—Emanuel Todd Voeltz
*Assistant Examiner*—George D. Morgan
*Attorney, Agent, or Firm*—Davidson & Gribbell, LLP

[57] ABSTRACT

An apparatus and method for highlighting holidays in a calendar software application of a portable intelligent communications device or in a separate computer, including the steps of specifying a geographical location, determining holidays for the geographical location, depicting a calendar on a display screen of such portable intelligent communications device or computer, and depicting holidays in a fashion different from other days on the calendar. The geographical location information is specified by the current location of the portable intelligent communications device or via a graphical user interface. The holiday information is obtained from a database housed in the portable intelligent communications device or via an Internet address connected through communications circuitry of the portable intelligent communications device. The holidays for the geographical location may be depicted in a color different from the other dates on the calendar and each holiday name may be depicted on the appropriate date of the calendar.

50 Claims, 9 Drawing Sheets

APPARATUS AND METHOD FOR HIGHLIGHTING HOLIDAYS OF A SPECIFIED LOCATION IN A CALENDAR SOFTWARE APPLICATION

BACKGROUND OF THE INVENTION

1. Field of the Invention

The present invention relates generally to a calendar software application and, more particularly, to an apparatus and method for highlighting holidays of a specified geographical location in a calendar software application operated by a portable intelligent communications device or a separate computer.

2. Description of Related Art

A new class of communication devices has been developed which includes a full computer integrated with the communications hardware and software. These devices, known as portable intelligent communications devices, differ significantly from personal digital assistants (PDAs) and handheld personal computers (HPCs) in that they are designed extensively to be a communications device rather than merely a "mobile computer." As such, the top features for the communications device are telephony, enhanced telephony, messaging, and information services. In order to enable at least some of these features, the portable intelligent communications device is able be connected to the Internet by either a wired link or a wireless link. It ill also be understood that certain software applications are provided within he portable intelligent communications device which facilitate the aforementioned features, as well as other desirable features such as a Personal Information Manager (PIM), games, and the like. An exemplary portable intelligent communications device is shown and disclosed in a patent application entitled "Switching Of Analog Signals In Mobile Computing Devices" and having Ser. No. 08/796,119, now abandoned, which is owned by the assignee of the present invention and is hereby incorporated by reference.

It will be understood that the aforementioned portable intelligent communications device is targeted to the traveling business person, particularly to one who travels to and calls foreign locations. Due to the number and different kinds of holidays observed around the world, it is important for the business person to know what and when such holidays are observed in each country so that phone calls can be placed and meetings scheduled without conflicting therewith. While some calendar software applications have been formatted to distinguish weekend days (i.e., Saturday and Sunday) from week days (i.e., Monday through Friday), no apparent effort has been made to distinguish holidays, particularly as related to a specified country. It would therefore be desirable for a calendar software application to be developed, which may be operated on a portable intelligent communications device or a separate computer, that is able to identify the holidays for countries around the world and distinguish them from other days on such calendar.

Accordingly, it is a primary object of the present invention to provide an apparatus and method in a calendar software application which permits identification of holidays observed in a selected country.

It is another object of the present invention to provide an apparatus and method in a calendar software application which distinguishes holidays from other days for a selected country.

It is still another object of the present invention to provide an apparatus and method in a calendar software application which permits identification of holidays observed in a plurality of selected countries, as well as distinction of such holidays for each selected country.

Yet another object of the present invention to provide an apparatus and method in a portable intelligent communications device for retrieving holiday information for a selected country via connection to an Internet address.

These objects and other features of the present invention will become more readily apparent upon reference to the following description when taken in conjunction with the following drawings.

SUMMARY OF THE INVENTION

In accordance with a first aspect of the present invention, a method of highlighting holidays in a calendar software application of a portable intelligent communications device or in a separate computer is disclosed as including the steps of specifying a geographical location, determining holidays for the geographical location, and depicting the holidays in a fashion different from other days on a calendar graphic. The geographical location information is specified by the current location of the portable intelligent communications device or via a graphical user interface. The holiday information is obtained from a database housed in the portable intelligent communications device or via an Internet address connected through communications circuitry of portable intelligent communications device. The holidays for the geographical location may be depicted in a color different from the other days or dates on the calendar graphic and each holiday name may be depicted on the appropriate day of the calendar graphic.

In accordance with a second aspect of the present invention, a portable intelligent communications device is disclosed as including circuitry for performing telephony operations, a processing circuit, a calendar software application stored in memory of the portable intelligent communications device, and a display screen coupled to the processing circuit on which a calendar graphic is depicted. The processing circuit is operable to depict holidays of a specified geographical location on the calendar graphic in a fashion different from other days thereon. The geographical location is specified as either the current location of the portable intelligent communications device or via a graphical user interface depicted on the display screen of the portable intelligent communications device. The processing circuit obtains the holiday information for the specified geographical location from either a database or from an Internet address connected through the telephony circuitry of the portable intelligent communications device. The holidays are then depicted on the calendar graphic in a color different than other days or dates thereon and each holiday name may be depicted for the respective date thereof.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
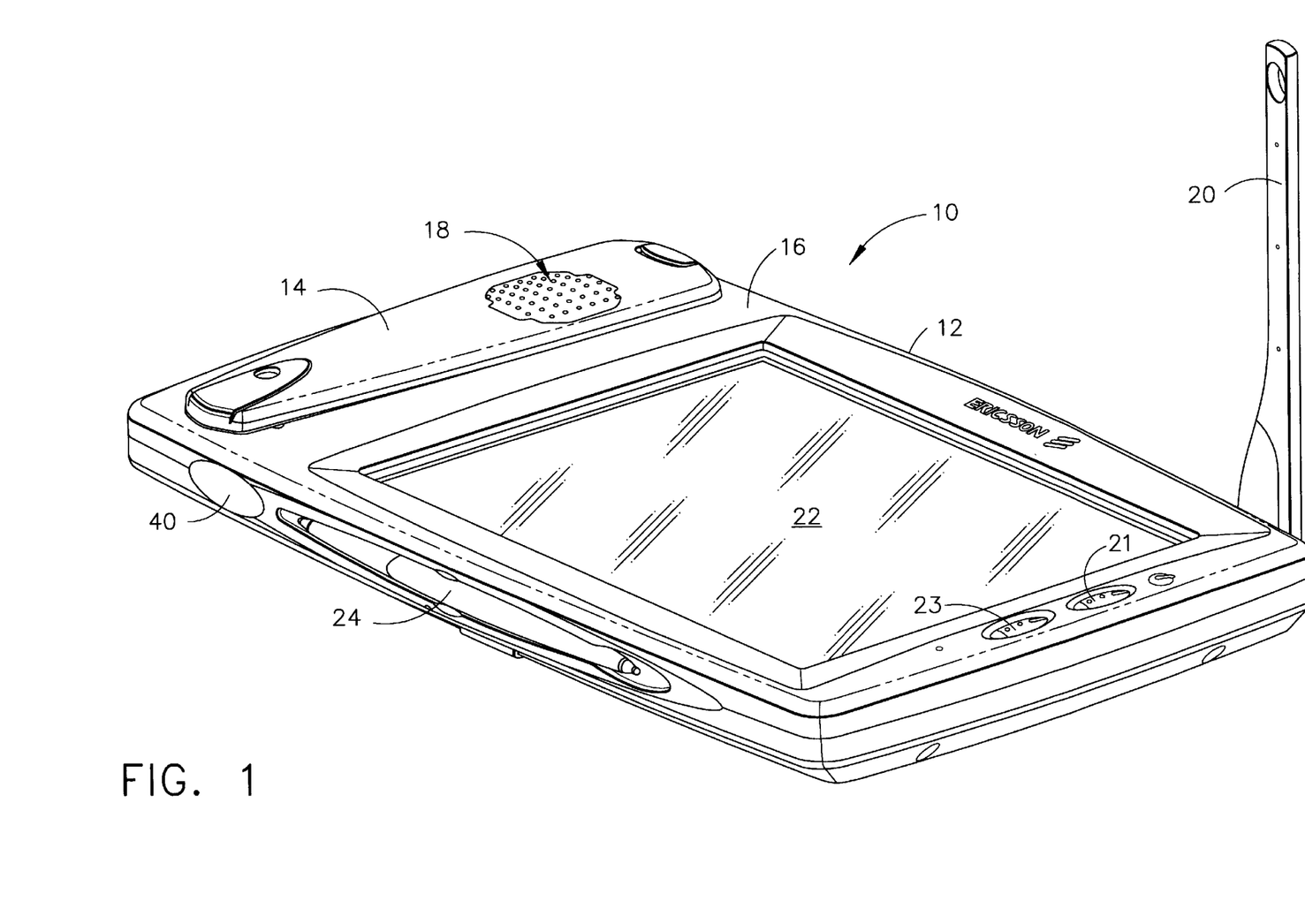
FIG. 1 is a perspective view of a portable intelligent communications device having a calendar software application integrated therewith in accordance with the present invention.

Referring now to the drawings in detail, wherein identical numerals indicate the same elements throughout the figures, FIG. 1 depicts a portable intelligent communications device identified generally by the numeral 10. It will be understood that portable intelligent communications device 10 is principally a communications device and includes circuitry and components which allows it to function in such capacity through cellular, landline, infrared data association (IrDA), phone cards, and other modes. Portable intelligent communications device 10 also includes circuitry which enables it to function in the capacity of a computer and a plurality of software applications may be utilized therewith. Because of this combination, portable intelligent communications device 10 is uniquely suited to interface software applications with the communications hardware and software, particularly where connection to an Internet address is desired. In this regard, it will be understood that portable intelligent communications device generally operates in accordance with a device shown and described in a patent application entitled "Switching Of Analog Signals In Mobile Computing Devices" and having Ser. No. 08/796,119, now abandoned, which is also owned by the assignee of the present invention and is hereby incorporated by reference.

As seen in FIG. 1, portable intelligent communications device 10 includes a casing 12 for housing the communications and other circuitry as will be discussed in greater detail hereinafter. A handset 14 is positioned within a top portion 16 of casing 12 and preferably includes a built-in speaker 18 for use when handset 14 is maintained there. A pivotable antenna 20 (shown in FIG. 1 in the open or use position) is provided to enable a communications function, as when portable intelligent communications device 10 is in a cellular mode of operation. It will be understood that various ports, jacks, and interfaces will be provided to further enable communications functions by portable intelligent communications device 10. Control buttons 21 and 23 are also shown as being located on top portion 16 of casing 12.

Portable intelligent communications device 10 further includes a display screen 22, which preferably is a type in which a user of the device is able to interact through touching designated areas thereon. It will be appreciated that a stylus 24 may optionally be utilized to indicate a particular area more specifically than can be accomplished with the user's finger, although most designated areas are sized for touch interaction by a typically sized finger. Since portable intelligent communications device 10 preferably is no larger than a standard business desk telephone, display screen 22 is sized to be approximately eight (8) inches measured diagonally across. This puts screen display 22 in a distinct size class, as it is smaller than normal monitor sizes for personal and portable computers and larger than screen displays for personal digital assistants (PDAs), calculators, and other similar personal electronic devices.

Figure 2:
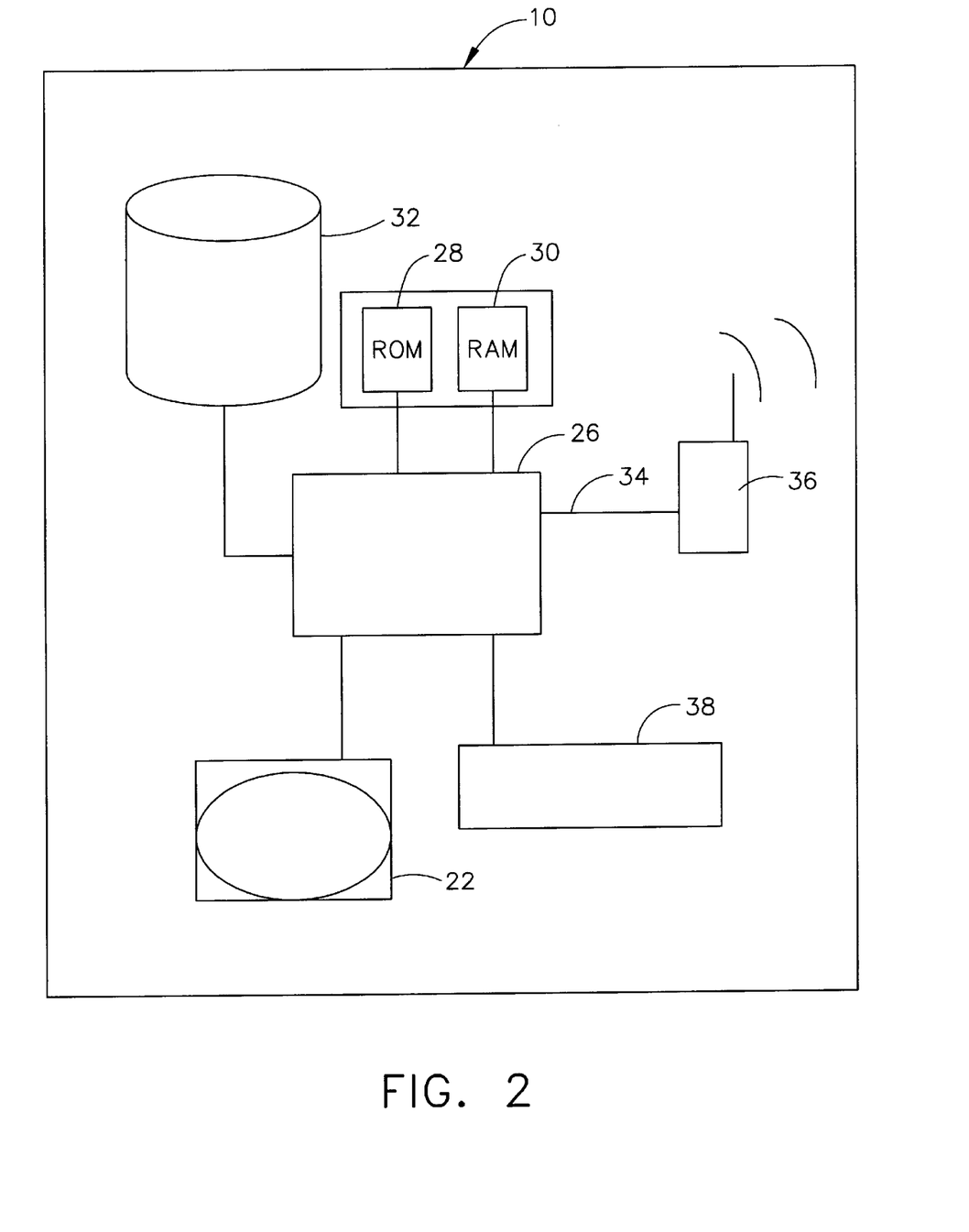
FIG. 2 is a simplified high level block diagram of the portable intelligent communications device depicted in FIG. 1.

Turning to FIG. 2, the internal circuitry of portable intelligent communications device 10 includes a processing circuit 26, which may, for example, be a Motorola microprocessor known by the designation Power PC 821. It will be seen that processing circuit 26 is connected to both Read Only Memory (ROM) 28 and Random Access Memory (RAM) 30 in which both operating systems and software applications are stored. An optional bulk storage device 32 is further provided for storing databases. Processing circuit 26 is also coupled to display screen 22 through a standard driver (not shown) in order to control the images displayed thereon, as well as receive information through graphical user interfaces in which the user of portable intelligent communications device 10 may indicate chosen options. The communications functions of portable intelligent communications device 10 are also handled through processing circuit 26 via a serial and/or parallel port 34 to the particular circuitry of a communications mode designated generically by reference numeral 36. As noted hereinabove, there are several communication mode options available, including cellular, landline, IrDA, and phone cards, and it will be appreciated that more than one such option may be utilized at a given time. A keyboard 38 may also be connected to processing circuit 26, where keyboard 38 can be depicted on display screen 22 or be a separate physical package which can be utilized with portable intelligent communications device 10 such as through a keyboard IR port 40 (see FIG. 1).

Figure 3:
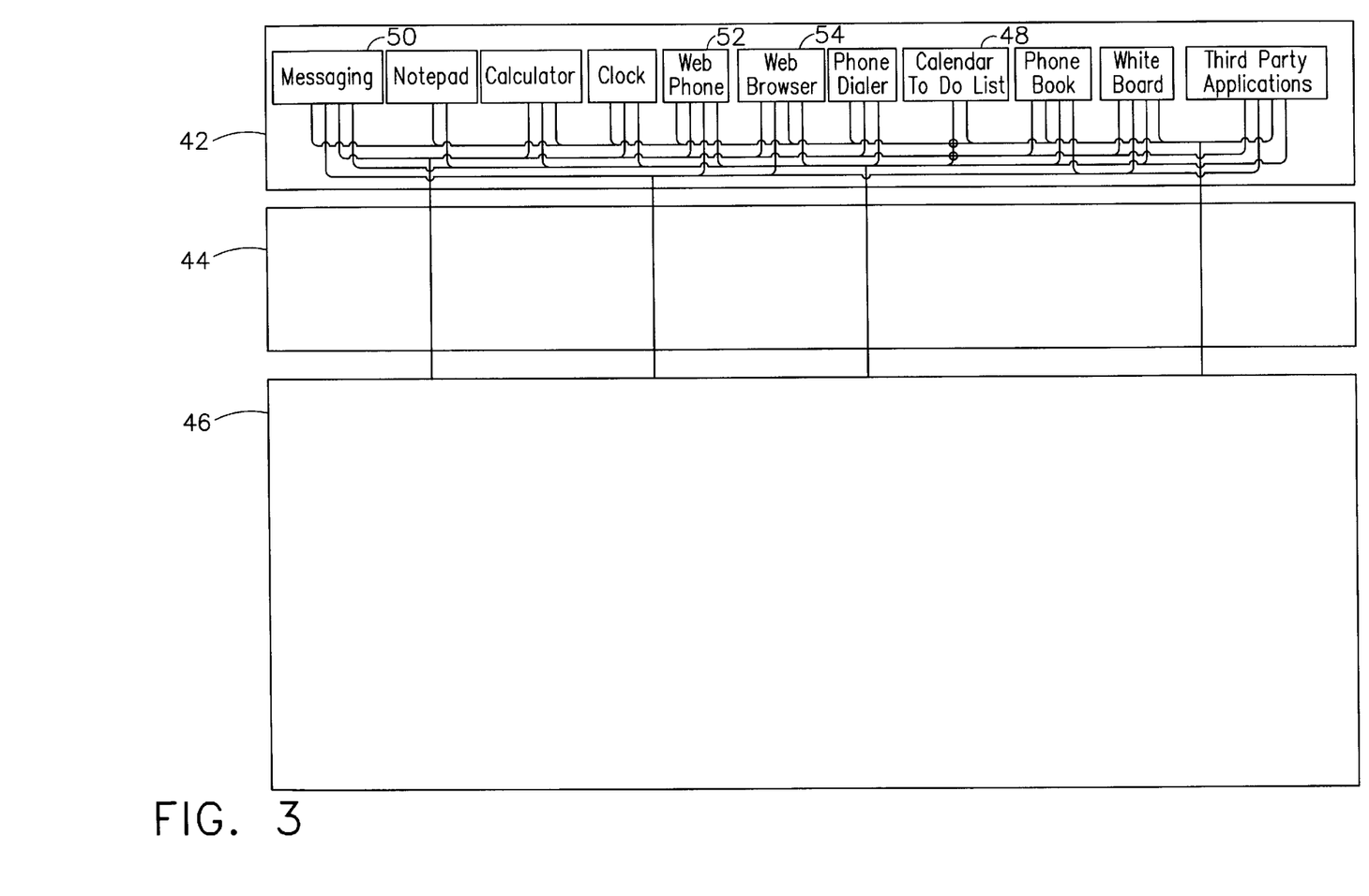
FIG. 3 is a block diagram of the software architecture for the portable intelligent communications device depicted in FIGS. 1 and 2 which includes certain software applications in accordance with the present invention.

FIG. 3 depicts a schematic block diagram of the software architecture for portable intelligent communications device 10. As seen therein, the software is divided into three basic areas: applications software 42, desktop software 44, and system operating software 46 (which includes everything else from the class libraries down to the device drivers for portable intelligent communications device 10). It will be understood that neither applications software 42 nor desktop software 44 will ever interact with anything other than the top layer of system operating software 46. Exemplary software applications are shown within applications software 42, with particular reference being made to calendar/to do list software application 48, messaging software application 50, web phone software application 52, and web browser software application 54.

Figure 4:
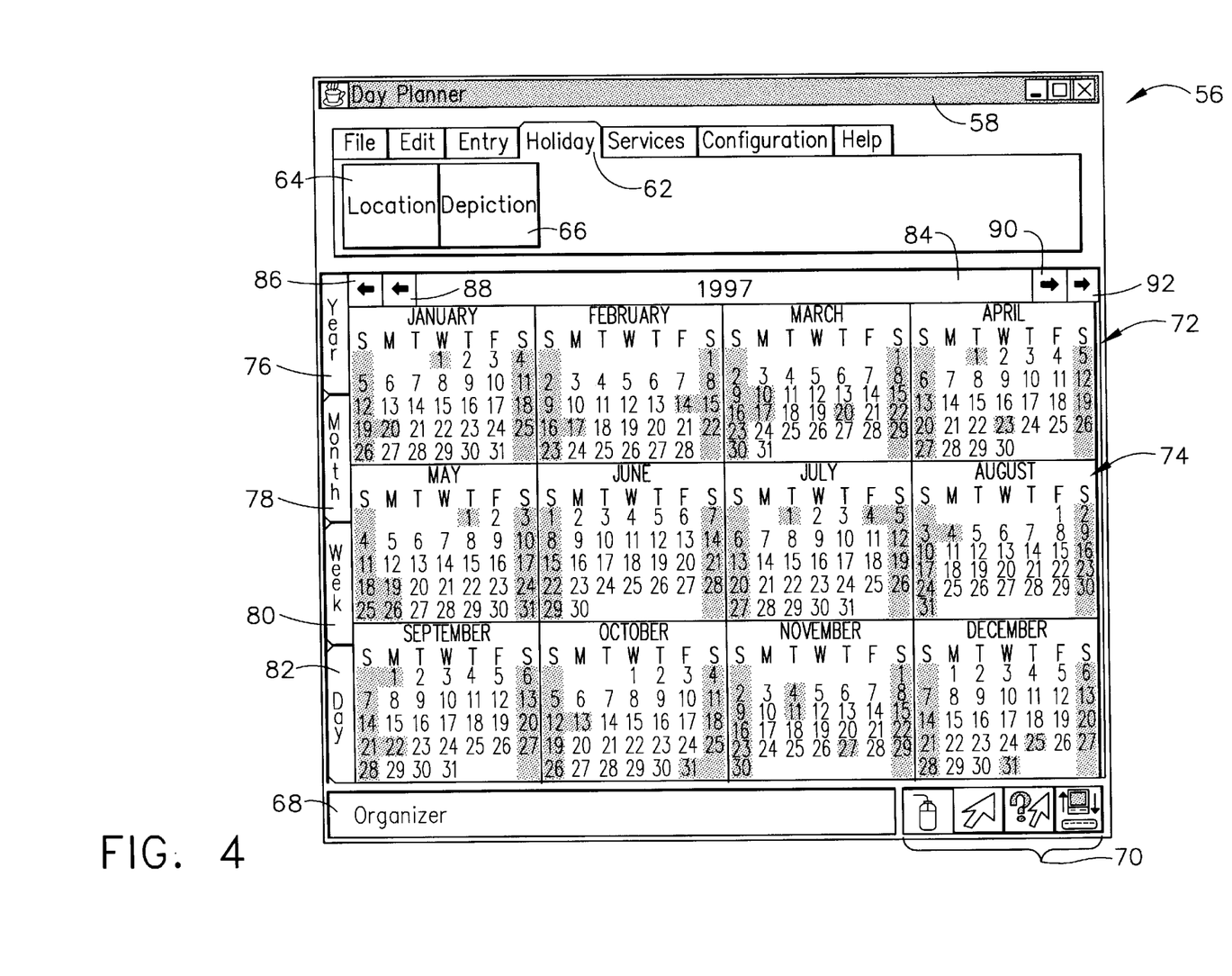
FIG. 4 is an exemplary screen display for the calendar software application depicted in FIG. 3 in which the holidays of a chosen country are distinguished.
Figure 5:
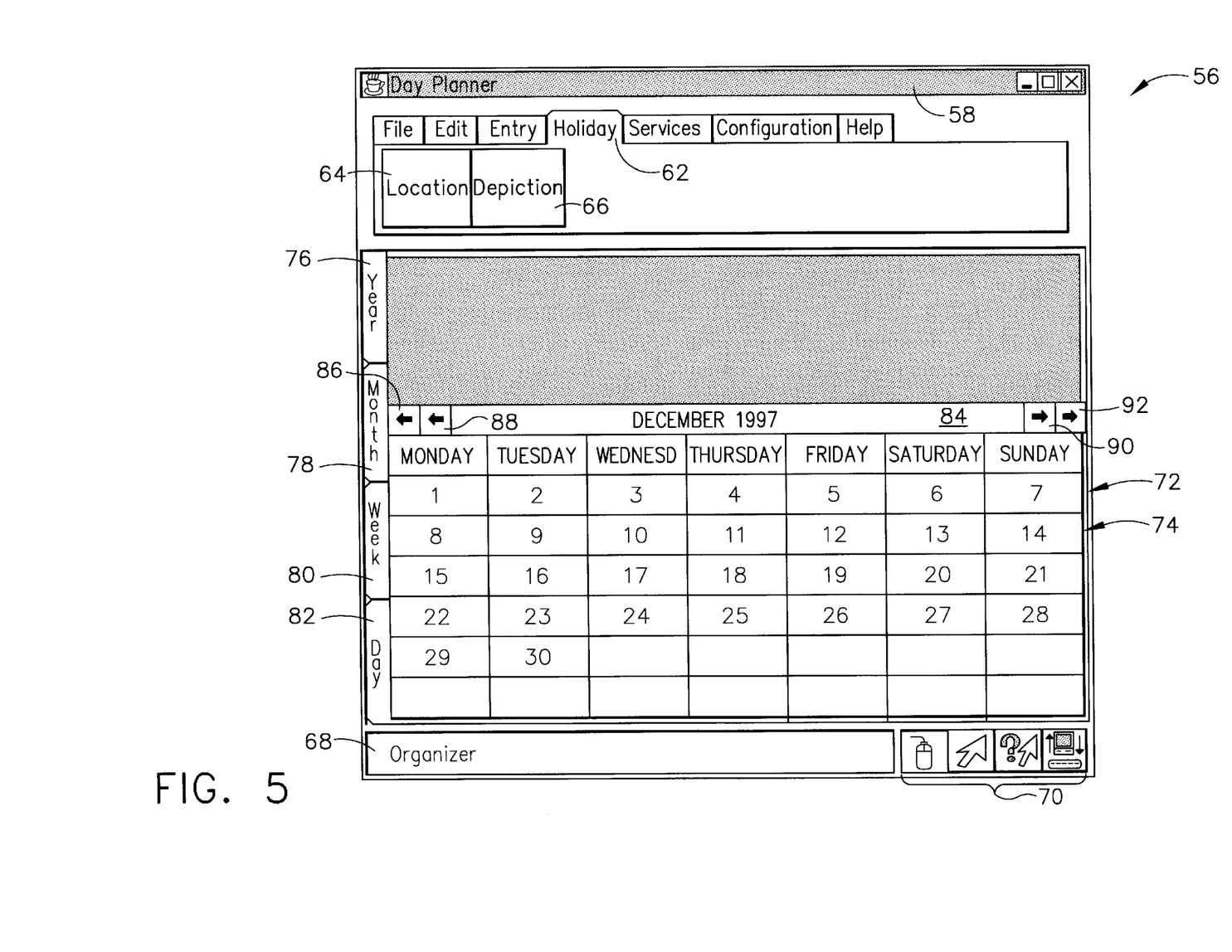
FIG. 5 is an alternative exemplary screen display for the calendar software depicted in FIG. 3 on which the holidays of a chosen country are distinguished.

In accordance with the present invention, FIG. 4 illustrates an exemplary screen display 56 shown on display screen 22 when portable intelligent communications device 10 operates within calendar/to do list software application 48, although it will be appreciated that similar screen displays are available when calendar/to do list software application 48 is operated by any computer or other device containing a computer. It will be noted that screen display 56 includes a title bar 58 located in a top window, as well as standard control buttons located along the right-hand side of title bar 58. A main control panel 60 is shown as including a plurality of tabbed areas, one of which being designated "Holidays" and being identified by reference numeral 62. A second level of menu choices or control buttons appear after selection of one of the tabs in main control panel 60. It will be noted that the control buttons 64 and 66 available under Holiday tab 62 are denoted "Location" and "Depiction," respectively. A bottom rectangular area 68 of screen display 56 is preferably used to display status information and may include one or more mouse-mode control buttons 70.

It will be appreciated that screen display 56 includes a window known as a work area 72 in which a calendar graphic 74 is typically depicted. The format of calendar graphic 74 may be in a year format, a month format, a week format, or a day format as illustrated in FIGS. 4–7. This is accomplished via the selection of tabs 76, 78, 80, and 82 located along the side of calendar graphic 74.

Figure 8:
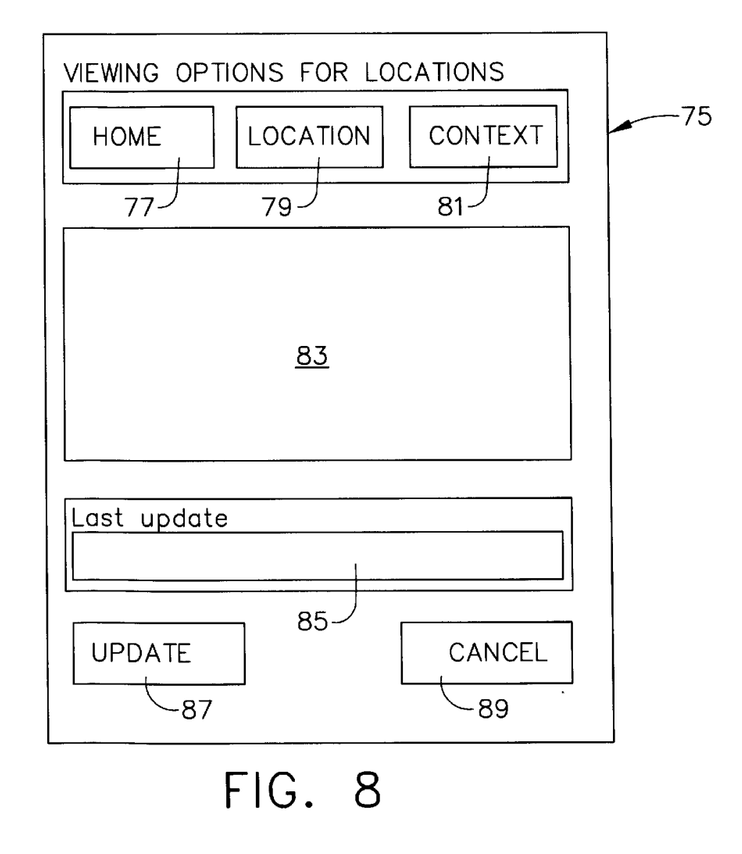
FIG. 8 is a view of the work area in the screen displays depicted in FIGS. 4–7, where the calendar graphic has been replaced by a configuration panel for the Location object.

Location control button 64 and Depiction control button 66 are utilized to select and/or configure the geographical location for which holiday information is desired and how such information will be shown on calendar graphic 74. As seen in FIG. 8, calendar graphic 74 in work area 72 is replaced by a new panel identified generally by the numeral 75 when Location control button 64 is selected. It will be seen in Location panel 75 that separate control buttons 77, 79, and 81 are provided to specify the "Home," "Location," and "Context" viewing options available. Home control button 77 is activated to indicate that location for which portable intelligent communications device 10 has been set as the home base of operation, Location control button 79 is activated to indicate the current location of portable intelligent communications device 10, and Context control button 81 is activated to indicate the location of a party with whom portable intelligent communications device 10 is having either a current conversation, if applicable, or the location of a party with whom portable intelligent communications device 10 most recently had a conversation (the term "conversation" including but not limited to voice, data, and white board communication). It will be appreciated that one or more of control buttons 79, and 81 may be activated at any given time so that the holiday information with respect to each location will be depicted on calendar graphic 74. With respect to the geographical locations selected through activation of control buttons 79 and 81, at least some, but not necessarily all, manners of obtaining such location information are described and shown in a patent application entitled "Apparatus And Method For Automatically Configuring Settings Of A Software Application In A Portable Intelligent Communications Device," filed concurrently herewith and having Ser. No. 08/955,974, which is also owned by the assignee of the present invention and is hereby incorporated by reference.

Location panel 75 further includes a window 83 within which a scrollable listing of locations is provided so that geographical locations different from those obtained via control buttons 77, 79, and 81 may be selected. Another window 85 is provided in Location panel 75 to indicate when the last update of holiday information was obtained for the applicable location(s), thereby assisting the user whether to rely on such information or to further update it. In this latter regard, a control button 87 is provided for requesting an "Update" to the currently stored holiday information and a control button 89 is provided to "Cancel" further selections in Location panel 75 and return to calendar graphic 74 being depicted in work area 72.

Figure 9:
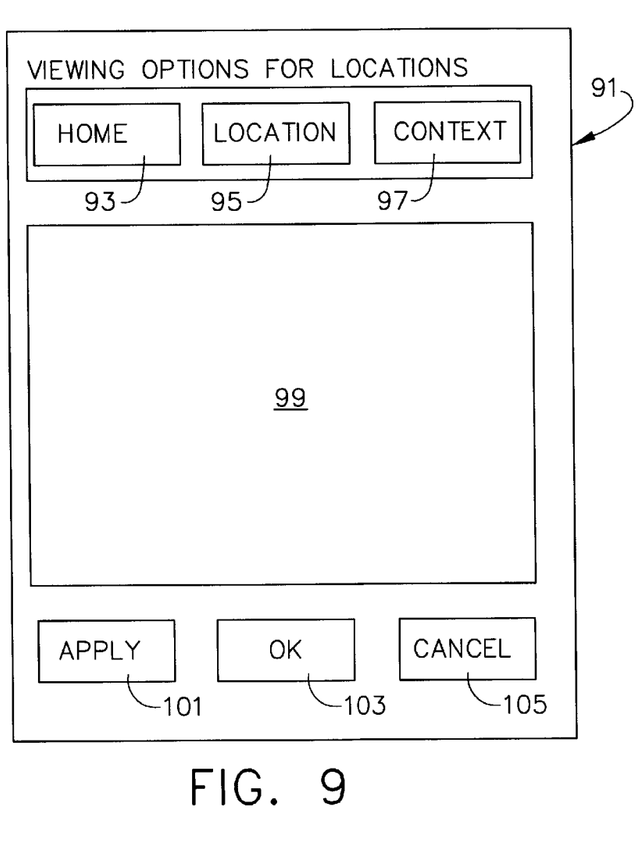
FIG. 9 is a view of the work area in the screen displays depicted in FIGS. 4–7, where the calendar graphic has been replaced by a configuration panel for the Depiction object.

When Depiction control button 66 is selected, a new panel 91 replaces calendar graphic 74 so that the manner of distinguishing holiday information in calendar graphic 74 can be set (see FIG. 9). As in Location panel 75, Depiction panel 91 includes control buttons 93, 95, and 97 representing the geographical locations for "Home," "Location," and "Context" as defined hereinabove. It will be understood that a setting for each location may be chosen by first activating the appropriate control button and then selecting one of the scrollable options listed in a window 99. These options generally will involve, but not be limited to, the selection of a certain color for highlighting an applicable date for a holiday in such geographical location, the selection of a certain color for writing the text or numeral of an applicable day or date for a holiday in such geographical location, or providing a designated symbol on an applicable date for a holiday in such geographical location. In this way, the holiday information can be distinguished not only between days on which holidays are observed and on days which they are not, but also between holidays of different selected locations. Once the appropriate setting for a control button is satisfactory, it is set by activating a control button 101 identified as "Apply." Then, a control button 103 is pushed to signify that the settings applied are "OK." Should the user of portable intelligent communications device 10 prefer to keep the previously stored settings, control button 105 is activated to "Cancel," which also returns calendar graphic 74 to work area 72.

With respect to the depiction of calendar graphic 74 in the year format, it is recognized in FIG. 4 that the dates of weekend days Saturday and Sunday (aligned under the headings of "S" and "S" at opposite sides for each month) are differentiated from other days of the week such as by highlighting (i.e., a different color than the background color for calendar graphic 74). In order to distinguish holidays on calendar graphic 74, screen display 56 also may provide highlighting of holiday dates thereon (holidays shown are those recognized by the United States of America) which may be one of the options in window 99 of Depiction panel 91. This highlighting of holidays preferably will be of a different color than the highlighting of weekend days (assuming such weekend highlighting is provided). In this way, a user of calendar software application 48 is able to discern from a glance at calendar graphic 74 whether to schedule a meeting or other appointment on a given day or if it conflicts with a recognized holiday.

Figure 6:
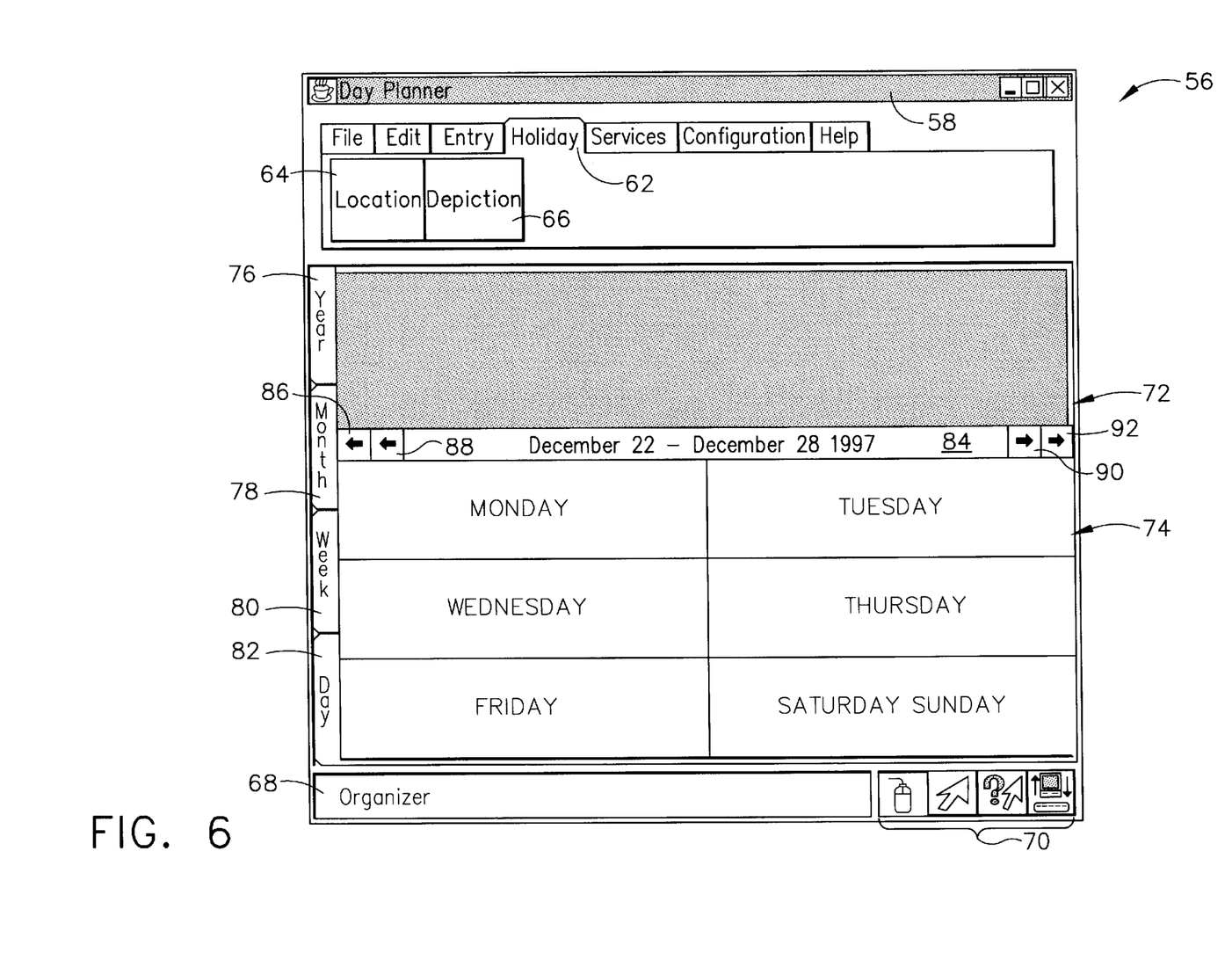
FIG. 6 is another alternative exemplary screen display for the calendar software depicted in FIG. 3 on which the holidays of a chosen country are distinguished.

Similarly, calendar graphic 74 in the month format (see FIG. 5) indicates a given holiday by distinguishing such date from the others. In this case, for example, the numeral(s) of a date on which a holiday is observed is depicted in a color different than the other numeral(s). Of course, the holiday date may stand out from the other dates in any number of other ways, including highlighting the square for such date in a color different than the background color for calendar graphic 74 as in FIG. 4. This can likewise be accomplished in calendar graphic 74 having a week format as seen in FIG. 6, where the text for a day on which a holiday is observed has a different color than the rest.

Figure 7:
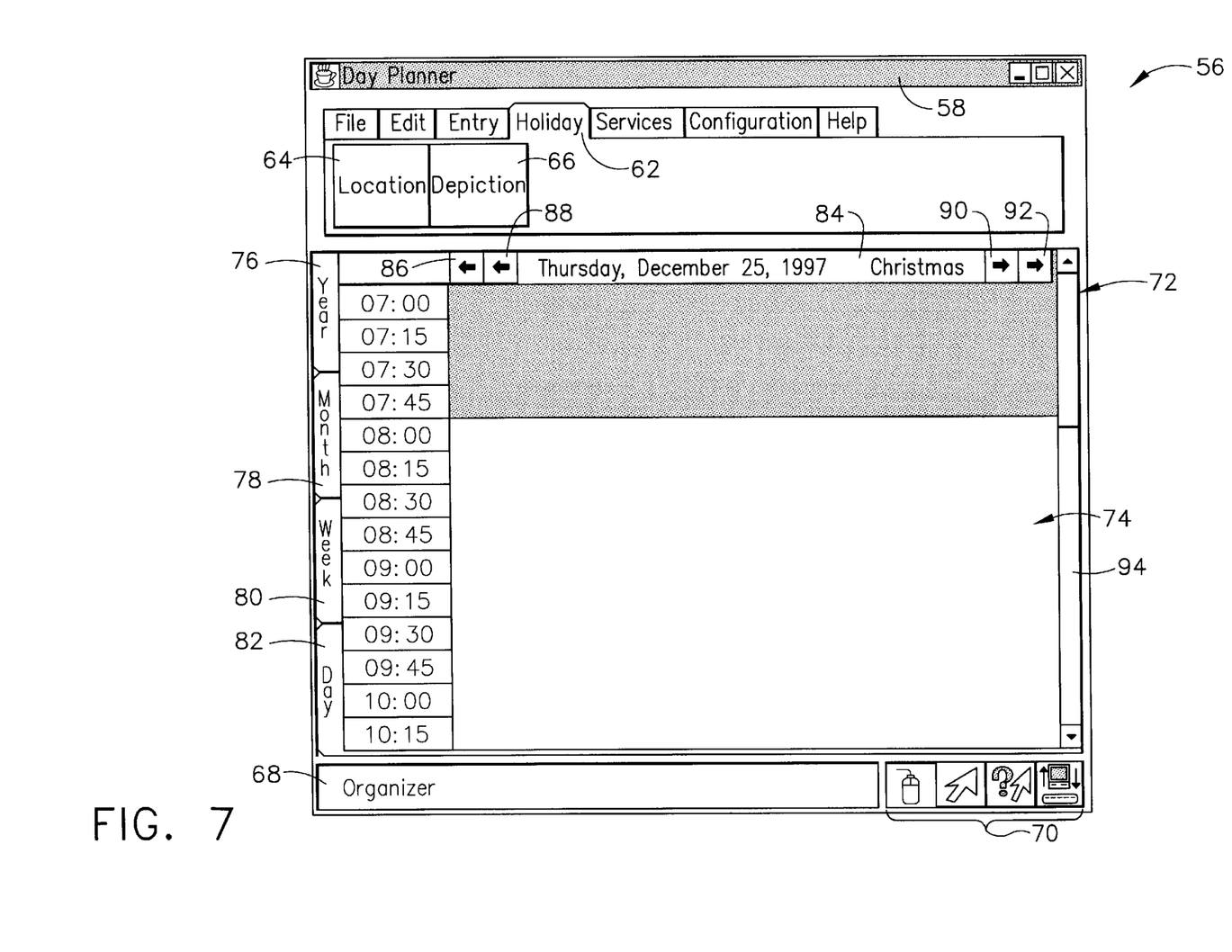
FIG. 7 is yet another alternative exemplary screen display for the calendar software depicted in FIG. 3 on which the holidays of a chosen country are distinguished.

It will also be noted that a horizontal bar 84 is preferably provided in FIGS. 4–7 so that calendar graphic 74 can identify the year, month, week, or day depicted. Additionally, a first pair of control buttons 86 and 88 are provided on a left-hand side of horizontal bar 84 and a second pair of control buttons 90 and 92 are provided on a right-hand side thereof. With respect to the year format depicted in FIG. 4, control buttons 86 and 92 move calendar graphic 74 back and forward one year while implementation of control buttons 88 and 90 are able to move calendar graphic 74 back and forward one month. For the month format depicted in FIG. 5, control buttons 86 and 92 move calendar graphic 74 back and forward one year, respectively, and control buttons 88 and 90 move calendar graphic 74 back and forward one month. Control buttons 86 and 92 move calendar graphic 74 back and forward one month, respectively, in the week format of FIG. 6, with control buttons 88 and 90 moving calendar graphic 74 back and forward one week. In FIG. 7, the day format of calendar graphic 74 utilizes control buttons 86 and 92 to move calendar graphic 74 back and forward one week, whereas control buttons 88 and 90 move calendar graphic 74 back and forward one day. Further, status bar 68 can be utilized in each of FIGS. 4–7 to reflect the last time such holidays were updated.

Within the day format of calendar graphic 74 depicted in FIG. 7, the text identifying the day and date in horizontal bar 84 may be written in a different color (e.g., red) for a holiday than for other days/dates. In addition, the particular holiday may be identified within horizontal bar 84. It will be seen that calendar graphic 74 in FIG. 7 will preferably include a vertical scroll bar 94 so as to view any desired time segment of the day.

Since the business traveler of today must be concerned with holidays of countries throughout the world, calendar graphic 74 may be altered to highlight or otherwise identify the holidays of any specified geographical location or country. Upon specification of such geographical location, processing circuit 26 then obtains the holiday information therefor (preferably comprising the name of the holiday and the date on which it is observed).

Processing circuit 26 obtains the holiday information through a database stored in bulk storage device 32 or alternatively via an Internet address to which communications circuitry 36 of portable intelligent communications device 10 connects. It will be understood that holiday information obtained over the Internet will preferably be accomplished in accordance with a procedure shown and described in a patent application entitled "Method And Apparatus For Updating Data Bases," having Serial No. 08/965,002, which is also owned by the assignee of the present invention and is hereby incorporated by reference. More specifically, processing circuit 26 creates a holiday highlighting filter in calendar software application 48, passes the filter to web phone software application 52 and web browser software application 54, retrieves the holiday information for the specified geographical location from a uniform resource location (URL), and passes the holiday information to calendar software application 48 for depiction on display screen 22. This process may also be used to update holiday information contained in a database for portable intelligent communications device 10.

An alternative manner of specifying the geographical location for which holiday information is desired is through a graphical image 96 which may be located in work area 72 of screen display 56. Graphical image 96 is obtained, for example, by selecting it as one of the options within window 83 of Location panel 79. It is utilized then for selecting and retrieving information as shown and described in a patent application entitled "Apparatus And Method For Retrieving Location Specific Information In A Portable Intelligent Communications Device" filed concurrently herewith and having Ser. No. 08/,955,914, which is also owned by the assignee of the present invention and is hereby incorporated by reference.

It will be understood that the present invention may also be applied to a calendar software application in a computer separate from portable intelligent communications device 10, although certain limitations are inherent thereto. This includes the inability, apart from additional equipment or circuitry, to obtain connection with an Internet address and all holiday information must therefore be obtained through a database stored in a memory device therein.

Figure 10:
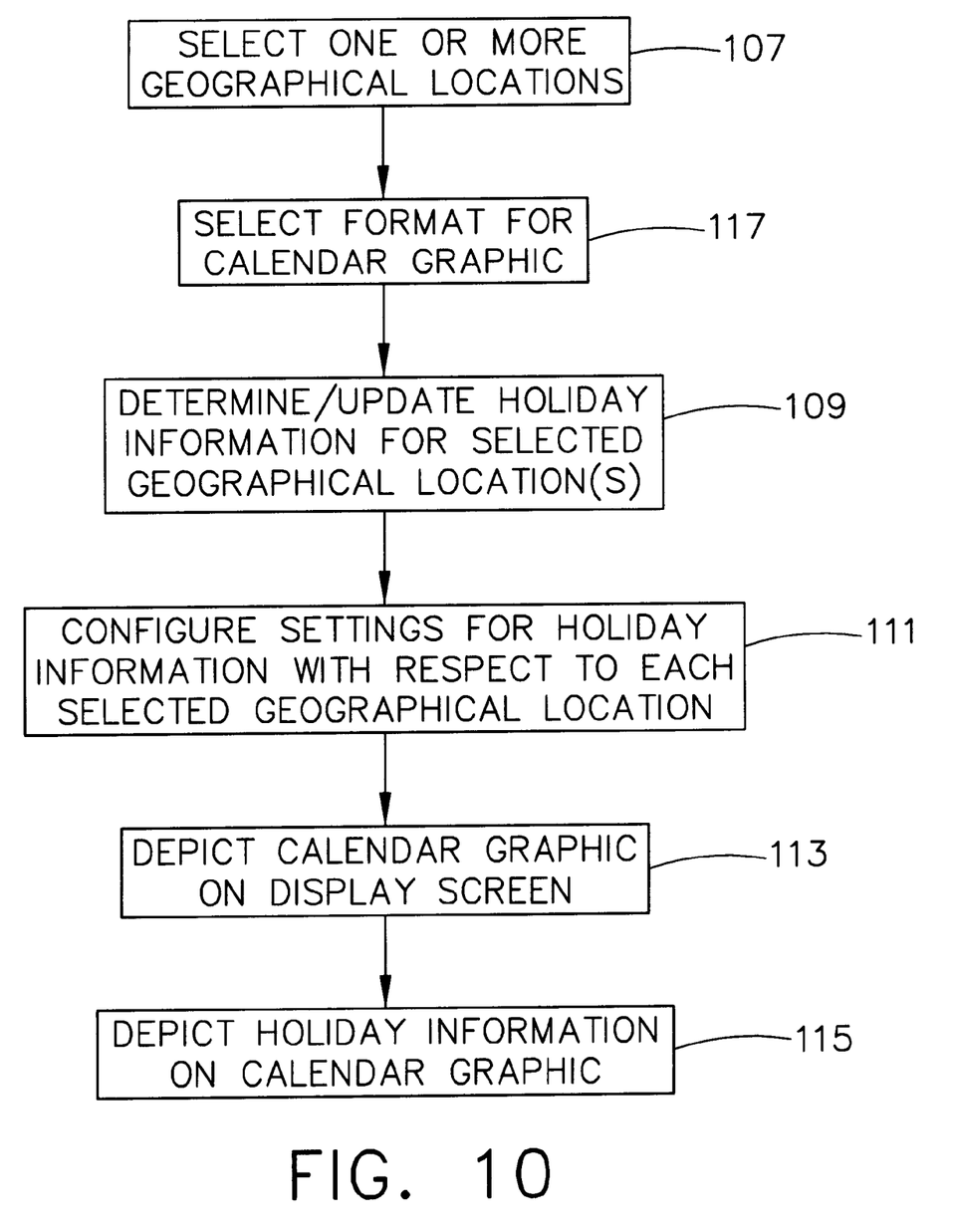
FIG. 10 is a flow chart of the steps taken by which the method of the present invention is accomplished.

With respect to the overall process performed in the present invention, it will be seen in the flow chart of FIG. 10 that such steps include: selecting one or more geographical locations (box 107) via the options available in Location panel 79; selecting the format for calendar graphic 74 on which to present such holiday information (box 117), i.e., either in the year, month, week, or day format shown in FIGS. 4–7, respectively; determining or updating the holiday information for each selected geographical location (box 109), such as through Update control button 87; configuring settings for holiday information with respect to each selected geographical location (box 111) via Depiction panel 91; depicting calendar graphic 74 within work area 72 of screen display 54 (box 113); depicting the holiday information for each selected geographical location on calendar graphic 74 (box 115).

Having shown and described the preferred embodiment of the present invention, further adaptations of the apparatus and method for highlighting holidays of a specified geographical location in a calendar software application can be accomplished by appropriate modifications by one of ordinary skill in the art without departing from the scope of the invention.

What is claimed is:

1. A method of highlighting holidays in a calendar software application of a portable intelligent communications device, comprising the following steps:

(a) specifying a geographical location, wherein said geographical location is specified as one of a location for a party with whom said portable intelligent communications device is currently conducting a conversation and a location for a party with whom said portable intelligent communications device most recently had a conversation;

(b) determining holidays for said specified geographical location;

(c) depicting a calendar graphic on a display screen of said portable intelligent communications device;

(d) integrating said holidays for said specified geographical location into said calendar graphic; and (e) depicting the dates of said holidays in a predetermined manner so as to differ from other dates on said calendar graphic.

2. The method of claim 1, further comprising the step of selecting how said holidays are to be depicted on said calendar graphic.

3. A method of highlighting holidays in a calendar software application operated by a computer, comprising:

(a) specifying a first geographical location;

(b) specifying a second geographical location:

(c) determining holidays for said first and second specified geographical locations;

(d) depicting a calendar graphic on a display screen of said computer;

(e) integrating said holidays for said first and second specified geographical locations into said calendar graphic; and (f) depicting said holidays in a predetermined manner so as to differ from other dates on said calendar graphic.

4. The method of claim 3, wherein said holidays are obtained from a database housed in said computer.

5. The method of claim 3, wherein said first and second geographical locations are specified by a user of said computer via a graphical user interface.

6. The method of claim 3, wherein numerals signifying each date on said calendar graphic having one of said holidays for said first and second specified geographical locations are depicted in a color different than other dates on said calendar graphic.

7. The method of claim 3, wherein each holiday name for said first and second specified geographical locations is depicted on said calendar graphic for a respective date thereon.

8. The method of claim 3, wherein each of said dates on said calendar graphic corresponding to said holidays of said first and second specified geographical locations includes a symbol indicating it as one of said holidays.

9. The method of claim 3, wherein said calendar graphic has a year format.

10. The method of claim 3, wherein said calendar graphic has a month format.

11. The method of claim 3, wherein said calendar graphic has a week format.

12. The method of claim 3, wherein said calendar graphic has a day format.

13. The method of claim 3, further comprising the step of selecting how said holidays for said first and second specified geographical locations are to be depicted on said calendar graphic.

14. The method of claim 3, wherein an area designated for each date on said calendar graphic having one of said holidays of said first and second specified geographical locations thereon is shaded a color different from a background color for said calendar graphic.

15. The method of claim 14, wherein an area designated for each date on said calendar graphic having one of said holidays for said first specified geographical location thereon is shaded a color different from a background color for each date on said calendar graphic having one of said holidays for said second specified geographical location.

16. A portable intelligent communications device, comprising:

(a) circuitry for performing telephony operations;

(b) a processing circuit;

(c) a calendar software application stored in memory of said portable intelligent communications device; and (d) a display screen coupled to said processing circuit, said processing circuit depicting a calendar graphic on said display screen;

wherein said processing circuit is operable to integrate holiday information of a first specified geographical location and a second specified geographical location into said calendar graphic so as to depict said holiday information of said first and second specified geographical locations on said calendar graphic in a predetermined manner so as to differ from other dates thereon.

17. The portable intelligent communications device of claim 16, wherein one of said first and second geographical locations is specified as a current location of said portable intelligent communications device.

18. The portable intelligent communications device of claim 16, wherein one of said first and second geographical locations is specified as a home location for said portable intelligent communications device.

19. The portable intelligent communications device of claim 16, wherein one of said first and second geographical locations is specified as a location for a party with whom said portable intelligent communications device is currently conducting a conversation.

20. The portable intelligent communications device of claim 16, wherein one of said first and second geographical locations is specified as a location for a party with whom said portable intelligent communications device most recently had a conversation.

21. The portable intelligent communications device of claim 16, wherein said first and second geographical locations are specified via a graphical user interface depicted on said display screen of said portable intelligent communications device.

22. The portable intelligent communications device of claim 16, wherein said processing circuit obtains said holiday information from a database housed in said portable intelligent communications device.

23. The portable intelligent communications device of claim 16, wherein said processing circuit obtains said holiday information from a connection to an Internet address.

24. The method of claim 16, wherein numerals signifying each date on said calendar graphic having one of said holidays for said first and second specified geographical locations are depicted in a color different than other dates on said calendar graphic.

25. The portable intelligent communications device of claim 24, wherein said processing circuit updates holiday information for said first and second specified geographical locations.

26. The method of claim 16, wherein each holiday name for said first and second specified geographical locations is depicted on said calendar graphic for a respective date thereon.

27. The portable intelligent communications device of claim 26, wherein said processing circuit creates a holiday highlighting filter in said calendar software application, passes said filter to a web software application in said portable intelligent communications device, retrieves holiday information from a uniform resource location (URL), and passes said holiday information to said calendar software application.

28. The method of claim 16, wherein each of said dates on said calendar graphic corresponding to said holidays of said first and second specified geographical locations includes a symbol indicating it as one of said holidays.

29. The method of claim 16, wherein an area designated for each date on said calendar graphic having one of said holidays of said first and second specified geographical locations thereon is shaded a color different from a background color for said calendar graphic.

30. A method of highlighting holidays in a calendar software application of a portable intelligent communications device, comprising the following steps:

(a) specifying at least two geographical locations;

(b) determining holidays for each said specified geographical location;

(c) depicting a calendar graphic on a display screen of said portable intelligent communications device;

(d) integrating said holidays for each said specified geographical location into said calendar graphic; and (e) depicting dates of said holidays for each said selected geographical location in a predetermined manner so as to differ from other dates on said calendar graphic.

31. The method of claim 30, wherein one of said geographical locations is specified as a current location of said portable intelligent communications device.

32. The method of claim 30, wherein one of said geographical locations is specified as a home location of said portable intelligent communications device.

33. The method of claim 30, wherein one of said geographical locations is specified as a location with whom said portable intelligent communications device is currently conducting a conversation.

34. The method of claim 30, wherein one of said geographical locations is specified as a location for a party which whom said portable intelligent communications device most recently had a conversation.

35. The method of claim 30, wherein said geographical locations are specified by a user of said portable intelligent communications device via a graphical user interface.

36. The method of claim 1, wherein said holidays are obtained from a database housed in said portable intelligent communications device.

37. The method of claim 36, further comprising the step of updating holidays for said specified geographical locations.

38. The method of claim 30, wherein said holidays are obtained via an Internet connection with said portable intelligent communications device.

39. The method of claim 38, further comprising the following steps:
(a) creating a holiday highlighting update filter in said calendar software application;
(b) passing said filter to a web software application in said portable intelligent communications device;
(c) retrieving location and holiday date information from a uniform resource location (URL); and
(d) passing said location and holiday date information to said calendar software application.

40. The method of claim 30, wherein numerals signifying each date on said calendar graphic having one of said holidays for said specified geographical locations are depicted in a color different than other dates on said calendar graphic.

41. The method of claim 30, wherein each holiday name for said specified geographical locations is depicted on said calendar graphic for a respective date thereon.

42. The method of claim 30, wherein each of said dates on said calendar graphic corresponding to said holidays of said specified geographical locations includes a symbol indicating it as one of said holidays.

43. The method of claim 30, wherein said calendar graphic has a year format.

44. The method of claim 30, wherein said calendar graphic has a month format.

45. The method of claim 30, wherein said calendar graphic has a week format.

46. The method of claim 30, wherein said calendar graphic has a day format.

47. The method of claim 30, further comprising the step of selecting how said holidays of each said specified geographical location are to be depicted on said calendar graphic.

48. The method of claim 30, wherein an area designated for each date on said calendar graphic having one of said holidays of said specified geographical locations thereon is shaded a color different from a background color for said calendar graphic.

49. The method of claim 48, wherein numerals signifying each date on said calendar graphic having one of said holidays for one of said specified geographical locations thereon is depicted in a color different from numerals signifying each date on said calendar graphic having one of said holidays for any other specified geographical location.

50. The method of claim 30, further comprising the step of specifying a third geographical location prior to said holiday determination step.

* * * * *

UNITED STATES PATENT AND TRADEMARK OFFICE
CERTIFICATE OF CORRECTION

PATENT NO. : 6,064,975  
DATED : May 16, 2000  
INVENTOR(S) : Billy G. Moon, Tammy A. Wooldridge It is certified that error appears in the above-identified patent and that said Letters Patent is hereby corrected as shown below:

Column 11,  
Line 15, claim 36, delete [1] and insert 30.

Signed and Sealed this

Twenty-eighth Day of August, 2001

*Attest:*

NICHOLAS P. GODICI  
*Attesting Officer*     *Acting Director of the United States Patent and Trademark Office*